United States Patent
Kabuto et al.

(10) Patent No.: US 12,108,108 B2
(45) Date of Patent: Oct. 1, 2024

(54) TRANSMISSION DEVICE, RELAY DEVICE, AND RECEPTION DEVICE

(71) Applicant: Maxell, Ltd., Kyoto (JP)

(72) Inventors: Nobuaki Kabuto, Kyoto (JP); Manabu Katsuki, Kyoto (JP); Hitoshi Akiyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 25 days.

(21) Appl. No.: 17/801,810

(22) PCT Filed: Feb. 12, 2021

(86) PCT No.: PCT/JP2021/005374
§ 371 (c)(1),
(2) Date: Aug. 24, 2022

(87) PCT Pub. No.: WO2021/177002
PCT Pub. Date: Sep. 10, 2021

(65) Prior Publication Data
US 2023/0092523 A1 Mar. 23, 2023

(30) Foreign Application Priority Data
Mar. 6, 2020 (JP) ................................. 2020-038766

(51) Int. Cl.
*H04N 21/4363* (2011.01)
*H04N 21/443* (2011.01)

(52) U.S. Cl.
CPC ... *H04N 21/43632* (2013.01); *H04N 21/4436* (2013.01)

(58) Field of Classification Search
CPC ......... H04N 21/43632; H04N 21/4436; H04N 21/43635; H04N 21/41265;
(Continued)

(56) References Cited

U.S. PATENT DOCUMENTS 4,477,847 A * 10/1984 Knight ................. G11B 17/005
360/60
7,843,513 B2 * 11/2010 Descure ................ H04N 5/765
348/706
(Continued)

FOREIGN PATENT DOCUMENTS

JP 2012-507947 A 3/2012
JP 2013-258667 A 12/2013
(Continued)

OTHER PUBLICATIONS

International Search Report of PCT/JP2021/005374 dated Apr. 27, 2021.

*Primary Examiner* — John W Miller
*Assistant Examiner* — Sean N. Haiem
(74) *Attorney, Agent, or Firm* — MATTINGLY & MALUR, PC

(57) ABSTRACT

A relay device or a connection cable for relaying a video signal from a transmission device to a reception device includes a control unit for detecting whether the received video signal is an AC signal output or a DC signal output, and a current pulling unit for pulling a predetermined current from the received video signal. If the received video signal is an AC signal output, the control unit is configured to control the current pulling unit to pull the predetermined current. If the received video signal is a DC signal output, the control unit is configured to control the current pulling unit to stop the pulling of current, and to transfer the video signal from the transmission device to the reception device.

11 Claims, 7 Drawing Sheets

(58) Field of Classification Search
CPC ....... H04N 21/42224; H04N 21/42221; H04N 21/42208; H04N 21/4222; H04N 5/38; H04L 12/40052; H04L 12/2856; H04L 12/40006; H04L 25/20; H04L 25/0272; G09G 5/006; G09G 5/008; G06F 13/409; G06F 3/04886; G06F 3/1462; G06F 3/1423; H04M 1/72409; H04M 1/724
USPC ......................................................... 348/723
See application file for complete search history.

(56) References Cited

U.S. PATENT DOCUMENTS

| 2007/0022466 | A1* | 1/2007 | Descure | H04N 5/765 386/E5.002 |
| 2008/0106643 | A1* | 5/2008 | Hall | H04N 7/108 348/E7.051 |
| 2009/0059782 | A1* | 3/2009 | Cole | H04L 25/0272 375/345 |
| 2010/0109795 | A1* | 5/2010 | Jones | G09G 5/006 333/101 |
| 2011/0293035 | A1* | 12/2011 | Kobayashi | H04L 25/4908 375/295 |
| 2013/0308059 | A1* | 11/2013 | Suzuki | H04N 5/38 348/723 |
| 2013/0308232 | A1* | 11/2013 | Rouet | H04L 25/06 361/56 |
| 2015/0046945 | A1* | 2/2015 | Zhang | G06F 3/04886 725/37 |
| 2019/0158913 | A1* | 5/2019 | Yoshizawa | G09G 5/008 |

FOREIGN PATENT DOCUMENTS

| JP | 2020-018018 A | 1/2020 |
| WO | 2011/158310 A1 | 12/2011 |
| WO | 2017/187515 A1 | 11/2017 |
| WO | 2019/059151 A1 | 3/2019 |

* cited by examiner

FIG. 7

| DIFFERENTIAL LINE | 501 (+ SIDE) | | | 502 (- SIDE) | | |
|---|---|---|---|---|---|---|
| TRANSISTOR | 622 | 623 | TOTAL CURRENT | 632 | 633 | TOTAL CURRENT |
| CONSTANT CURRENT CIRCUIT | 642 | 643 | | 642 | 643 | |
| LOGIC RATIO 6:4 | 2 mA | 2 mA | 4 mA | 0 mA | 0 mA | 0 mA |
| LOGIC RATIO 5:5 | 2 mA | 0 mA | 2 mA | 0 mA | 2 mA | 2 mA |
| LOGIC RATIO 4:6 | 0 mA | 0 mA | 0 mA | 2 mA | 2 mA | 4 mA |

FIG. 8

| DIFFERENTIAL LINE | 501 (+ SIDE) | | | 502 (- SIDE) | | |
|---|---|---|---|---|---|---|
| TRANSISTOR | 624 | 625 | TOTAL CURRENT | 634 | 635 | TOTAL CURRENT |
| CONSTANT CURRENT CIRCUIT | 644 | 645 | | 644 | 645 | |
| LOGIC RATIO 6:4 | 0 mA | 0 mA | 0 mA | 2 mA | 2 mA | 4 mA |
| LOGIC RATIO 5:5 | 0 mA | 2 mA | 2 mA | 2 mA | 0 mA | 2 mA |
| LOGIC RATIO 4:6 | 2 mA | 2 mA | 4 mA | 0 mA | 0 mA | 0 mA |

TRANSMISSION DEVICE, RELAY DEVICE, AND RECEPTION DEVICE

TECHNICAL FIELD

The present invention relates to a transmission system that relays video signals from a transmission device to a reception device.

BACKGROUND TECHNOLOGY

USB (Universal Serial Bus) (registered trademark) is one of the well-known serial bus standards for connecting peripheral devices to information equipment. There is USB Type-C as a connector standard established by the USB standard "USB 3.1".

As a background art of this technical field, there are Patent Document 1 and Patent Document 2. Patent Document 1 describes that a predetermined DC current is applied to an AC signal output from the USB Type-C to connect to an HDMI (High-Definition Multimedia Interface) (registered trademark) terminal of a television or the like. In addition, Patent Document 2 describes that a correction signal is added to an AC signal output and connected to an HDMI terminal of a television or the like as a video signal equivalent to a DC signal output.

PRIOR ART REFERENCES

Patent Documents

Patent Document 1: WO 2017/187515 A1
Patent Document 2: JP 2013-258667 A

SUMMARY OF THE INVENTION

Problems to be Solved by the Invention

Patent Document 1 has a problem of preparing a dedicated relay device or a connection cable when each video transmission device of AC signal output and DC signal output are mixed together.

In addition, in the Patent Document 2, when a correction signal is applied to an AC signal output, there is a problem that DC shift occurs between the differential signal lines due to the time difference between the + side correction signal application time and the − side correction signal application time.

The present invention has been made in view of these problems, and an object thereof is to improve the usability and reliability of the connection between transmission device and reception device.

Solutions to Problems

The present invention, in one example, is a relay device or connection cable that relays video signals from a transmission device to a reception device. The relay device or connection cable includes: a control unit detects whether a received video signal is an AC signal output or a DC signal output; and a current pulling unit to pull a predetermined current from the received video signal. The control unit controls the current pulling unit to pull the predetermined current when the received video signal is an AC signal output, and the current pulling unit controls the current pulling unit to stop current pulling and the video signal is transmitted from the transmission device to the reception device when the received video signal is a DC signal output.

Effects of the Invention

According to the present invention, it is possible to improve the usability and reliability of the connection between a transmission device and a reception device.

BRIEF DESCRIPTION OF THE DRAWINGS

FIG. 7 is a diagram illustrating constant current switching using a correction current of a correction circuit on a transmission device side for a DC blocking element in Embodiment 3.

FIG. 8 is a diagram illustrating constant current switching using a correction current of a correction circuit on a connection cable side for a DC blocking element in Embodiment 3.

MODE FOR CARRYING OUT THE INVENTION

Hereinafter, embodiments will be described with reference to the diagrams.

Embodiment 1

Figure 1:
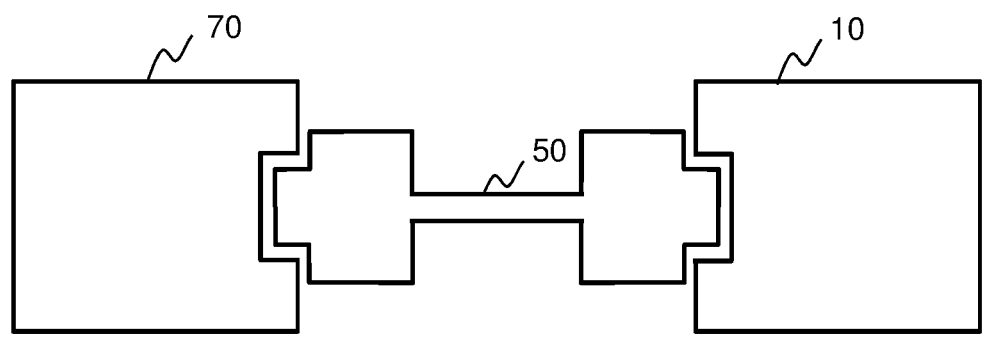
FIG. 1 is a transmission system configuration diagram which connected a transmission device and a reception device with a connection cable in Embodiment 1.

FIG. 1 is a configuration diagram of transmission device, connection cable, and a transmission system including a reception device in this Embodiment. In FIG. 1, a transmission device 70 and a reception device 10 are connected by a connection cable 50. The connection cable 50 functions as a relay device and transmits video signals transmitted from the transmission device 70 to the reception device 10.

Figure 2:
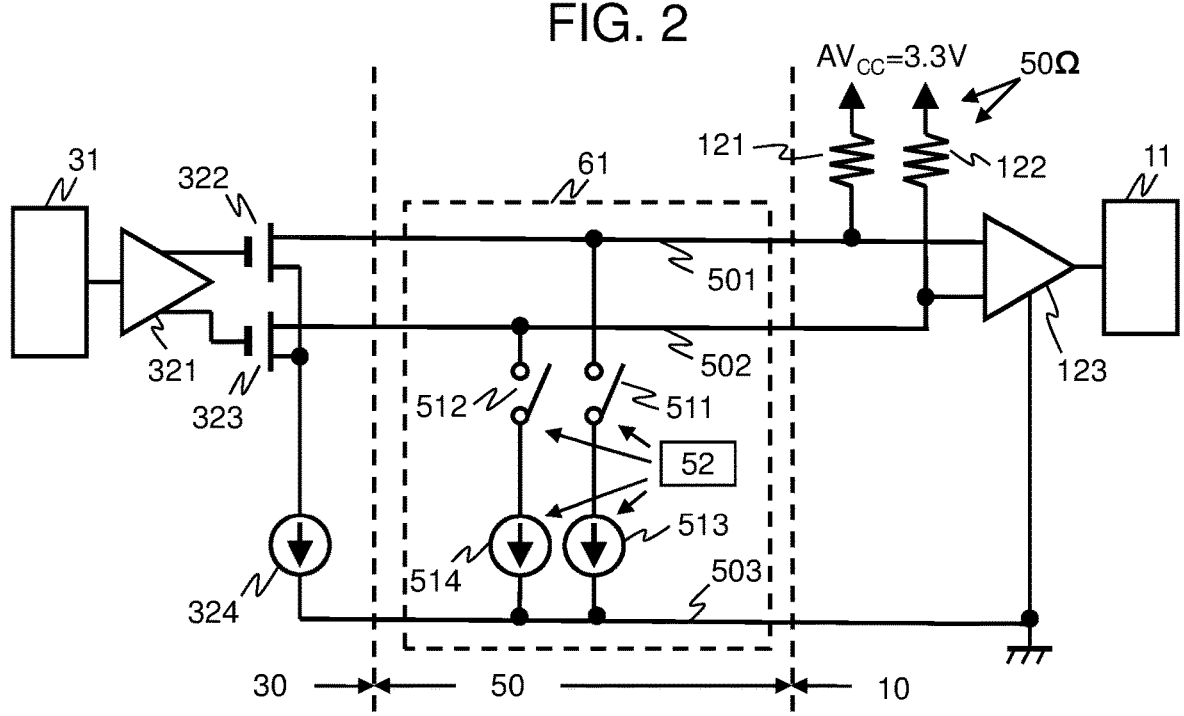
FIG. 2 is a diagram illustrating a connection of equipment using a connection cable when a transmission device with DC signal output is connected in Embodiment 1.
Figure 3:
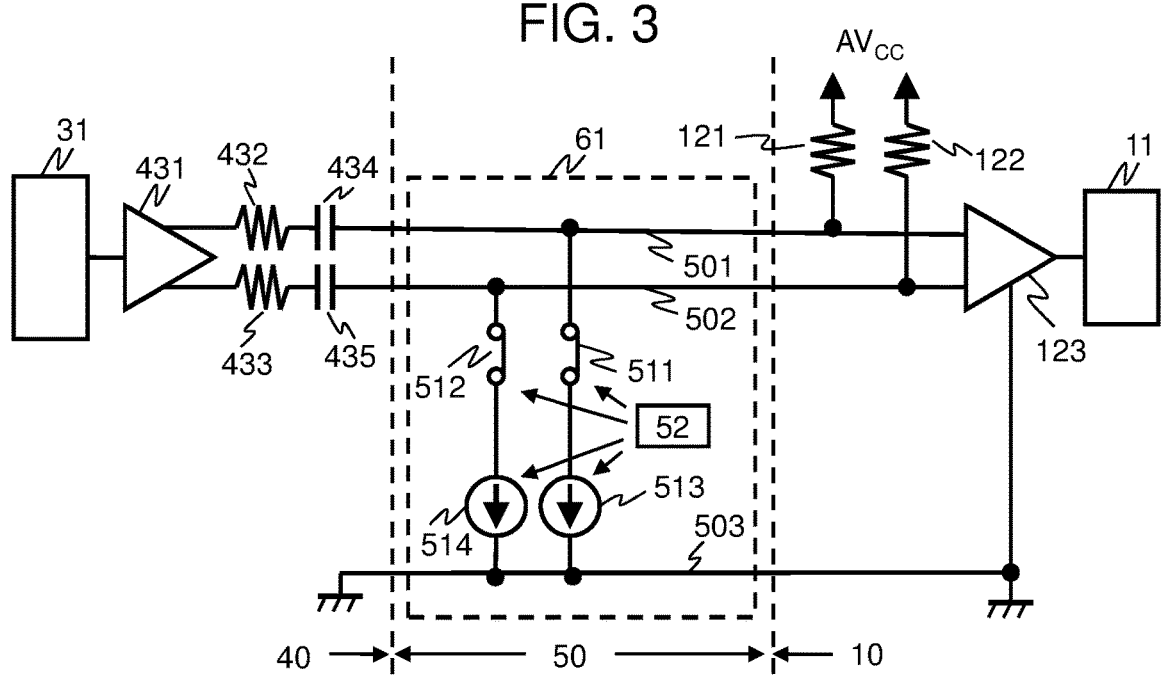
FIG. 3 is a diagram illustrating a connection of equipment using a connection cable when a transmission device with AC signal output is connected in Embodiment 1.

FIG. 2 is a partial configuration diagram illustrating an operation of the connection cable 50 when a transmission device 30 with DC signal output is connected as the transmission device 70. FIG. 3 is a partial configuration diagram illustrating an operation of the connection cable 50 when a transmission device 40 with AC signal output is connected as the transmission device 70.

First, let us describe FIG. 2. In FIG. 2, the transmission device 30 with DC signal output includes TMDS (Transition Minimized Differential Signaling) (registered trademark) encoder 31, driver 321, transistors 322 and 323, and a constant current circuit 324 in its configuration. The connection cable 50 consists of differential signal lines + side 501, − side 502, GND line (or shield line) 503, as well as a correction circuit 61 including switches 511 and 512, constant current circuits 513 and 514, and a control circuit 52. The reception device 10 includes terminating resistors 121 and 122 which are terminating elements, receiver 123, and TMDS decoder 11 in the configuration.

For example, the TMDS transmission device adopted by the HDMI and DVI (Digital Visual Interface) standard TMDS encodes a video signal into a serial signal by the TMDS encoder 31. The constant current 10 mA pulled by the constant current circuit 324 is pulled from either the + side 501 or the − side 502 of the differential signal line by the transistors 322 and 323 driven by the driver 321 based on the TMDS encoding result. The + side 501 and the − side 502 of the differential signal line are connected to the 3.3V terminating voltage AVcc via the 50Ω terminating resistors 121 and 122 on the reception device side, respectively. Therefore, it becomes a signal voltage of 3.3V to 2.8V, and a differential amplitude of 1 Vpp can be obtained. Of course, the signal level will vary due to attenuation in the connection cable 50.

When the control circuit 52 detects that the transmission device 30 of DC signal output is connected, the switches 511 and 512 are controlled to be open (OFF). Thereby, the connection cable 50 transmits differential signals in the same way as a normal cable without the correction circuit 61, thereby Signal transmission based on the TMDS method can be realized.

FIG. 3 is described next. In FIG. 3, the transmission device 40 with AC signal output includes TMDS encoder 31, driver 431, resistors 432 and 433, and DC blocking elements 434 and 435 such as capacitors in the configuration. Since the connection cable 50 and the reception device 10 have the same configuration as in FIG. 2, the description of the device configuration is omitted.

The AC signal output is obtained by the driver 431 outputting the TMDS encoding result of the TMDS encoder 31 via the resistances 432 and 433 of 50Ω and the DC blocking elements 434 and 435 such as a capacitor. Due to the AC signal output, the termination voltage AVcc of the reception device 10, for example 3.3V, is not directly applied to the driver 431, so that the driver 431 can be lowered in voltage, and the high frequency characteristics and low power consumption can be expected by miniaturizing semiconductors.

However, since the reception device 10 assumes the DC signal transmission device described in FIG. 2, the DC level of the signal must be matched. For this reason, when the control circuit 52 detects an AC signal output, it uses switches 511 and 512 are turned on, and constant current circuits 513 and 514 to pull almost 5 mA. This 5 mA is approximately half of the constant current 10 mA of the constant current circuit 324 in FIG. 2, assuming that the number of logic 0 and logic 1 of the encoded output is approximately 5:5 in the TMDS method. Thus, the constant current circuits 513 and 514 function as current pulling units.

In order to suppress the influence of the connection of the correction circuit 61 on the transmission characteristics of the connection cable, between switch 511 and the + side 501 of the differential signal line, and between switch 512 and the − side 502 of the differential signal line, respectively, may be inserted with a resistance of 100 to 330Ω. This insertion resistance is expected to be effective in reducing the effect on transmission characteristics in other embodiments.

As described in Patent Document 1, the constant current circuits 513 and 514 may be substituted with a resistance of 610Ω or the like or may be connected to a constant voltage circuit of 3.05V via an inductor and substituted. These substitutions can also be applied to other embodiments.

Thus, even when the transmission device 40 with AC signal output is connected, the same differential signal as when the transmission device 30 with DC signal output is connected is transmitted to the reception device 10 by the connection cable 50 and the reception device 10 can stably receive signals.

Figure 4:
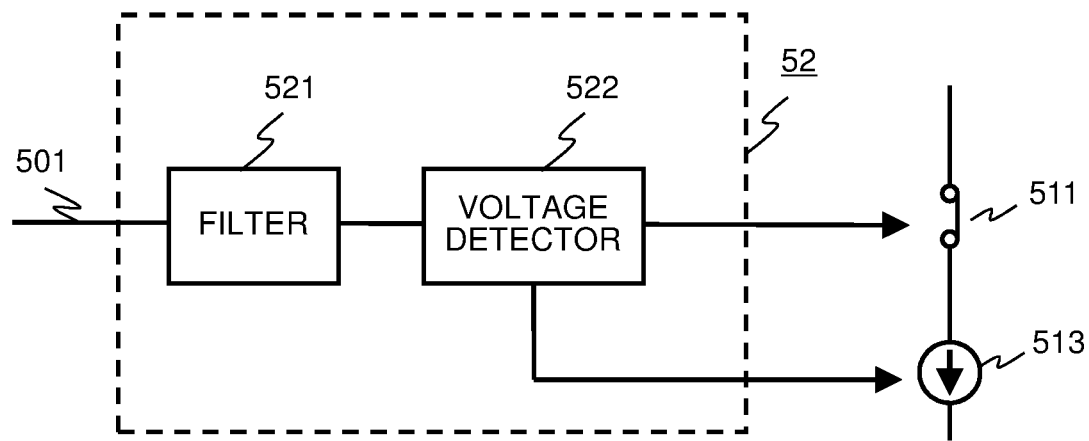
FIG. 4 is a diagram illustrating a configuration of a control circuit in a connection cable in Embodiment 1.

Next, an example of the configuration of the control circuit 52 is shown in FIG. 4. In FIG. 4, 521 is a filter and 522 is a voltage detector. Their operation is described below.

In FIG. 4, the DC voltage value is estimated by calculating the time average value of the signal voltage on the + side 501 of the differential signal line with the filter 521. The voltage detector 522 determines that the transmission device outputs AC signal when the DC voltage value is substantially equal to the termination voltage AVcc and determines that the transmission device outputs DC signal when the DC voltage value is lower than the termination voltage AVcc. Then, the voltage detector 522 turns the switch 511 ON in a case of AC signal and OFF in a case of DC signal. Instead of turning off the switch 511, current of the constant current circuit 513 may be stopped.

The termination voltage AVcc can be measured when the connection with the transmission device 30 or 40 is cut off, or when the transmission device 30 or 40 is not operating, but instead of the measurement, from the termination voltage AVcc=3.3V±5% determined by the TMDS specifications, with reference to 3.135V, which is the lower limit of 3.3V−5%, if the DC voltage value is higher than that, it can be determined that the transmission device is AC signal output. However, the terminal voltage AVcc may be 3.465V, which is an upper limit value of 3.3V+5%, and the DC voltage value of the DC signal output may be 3.265V, which is 0.2V lower than that. Considering this, if the estimated DC voltage is above 3.265V, it is determined to be an AC signal output, and if it is below 3.135V, it is determined to be a DC signal output, and if it is between them, it is preferable to change the current of the constant current circuit 513 from 5 mA (DC voltage estimated value 3.265 V) to 0 mA (DC voltage estimated value 3.135 V) with the switch 511 turned on.

In FIG. 4, the signal voltage of the + side 501 of the differential signal line is used for judgment, but the signal voltage of the − side 502 of the differential signal line may be used for judgment, or the sum or average of the + side 501 and the − side 502 may also be used for the judgment.

Although the above has been described as the connection cable 50, it is clear that this function can be configured as a relay device and combined with a regular cable to form a connection cable, and can be applied in other embodiments in the following.

As described above, this embodiment transmits a signal from the transmission device to a DC signal input reception device through a relay device or a connection cable that detects whether the transmission device outputs an AC or DC signal, adds no current in a case of DC signal and adds a predetermined current in a case of AC signal. This allows both transmission device with DC signal output and transmission device with AC signal output to be connected to the reception device via the same connection cable or relay device, thus there is no need to distinguish between connection cables or relay devices for DC signal output and AC signal output, the same connection cable or relay device can be used, and there is no need to prepare multiple connection cables or relay devices, improving usability.

In addition, if the relay device is incorporated within the reception device, reliable video signal transmission can be achieved using existing cables even if the transmission device with DC signal output and the transmission device with AC signal output are mixed, and even if a normal cable is used, the reception device that can be connected to the transmission device with DC signal output and the transmission device with AC signal output can be configured.

Embodiment 2

Figure 5:
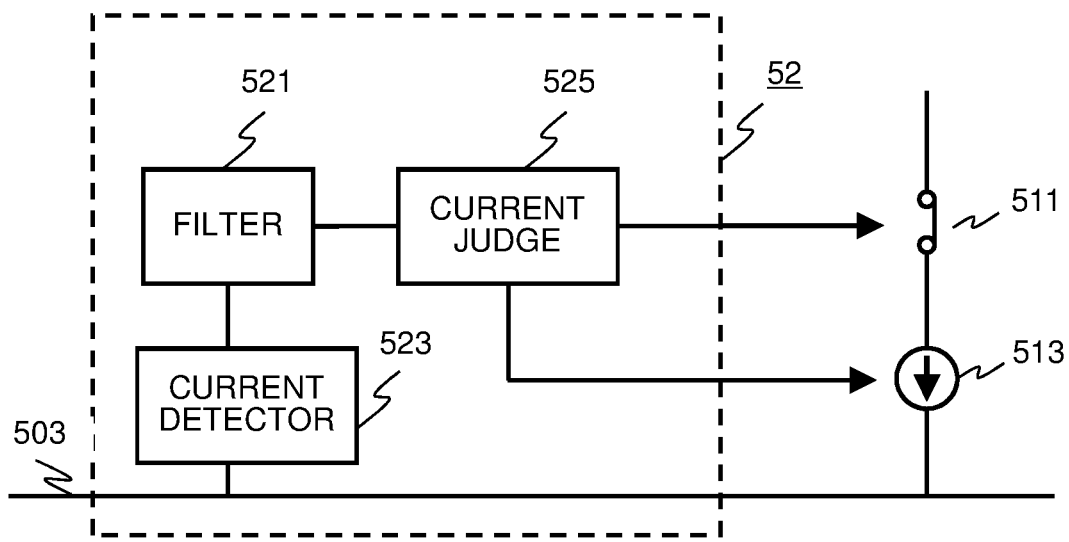
FIG. 5 is a diagram illustrating a configuration of a control circuit in a connection cable in Embodiment 2.

FIG. 5 is another configuration of the control circuit in the connection cable in this Embodiment. In FIG. 5, the same configurations as in FIG. 4 are marked with the same symbols and their descriptions are omitted. In FIG. 5, the difference from FIG. 4 is that the control circuit 52 has a current detector 523 and a current judge 525. Its operation is described below.

In FIG. 5, a return current from the termination voltage AVcc of the reception device 10 flows through the GND line 503 of the TMDS differential signal line. When the transmission device 30 with DC signal output is connected, this return current is substantially equal to the current value of 10 mA of the constant current circuit 324. After this current is detected by current detector 523, time averaging processing is performed by filter 521 to suppress noise components and give it to the current judge 525. If the current judge 525 determines that the current on the GND line 503 is approximately equal to the return current value of 10 mA, it determines that the connected transmission device is DC signal output, and the switch 511 is opened (OFF).

When transmission device 40 with AC signal output are connected, no return current is generated, so the only effect is from other circuits, resulting in a small current value. After this current is detected by current detector 523, time averaging processing is performed by filter 521 to suppress noise components and give it to the current judge 525. If the current judge 525 determines that this current is smaller than the TMDS specified return current, the connected transmission device is Judging it as AC signal output, switch 511 is shorted (ON) and the constant current circuit 513 pulls about 5 mA. According to this embodiment, the ambiguity of the judgment can be reduced compared to the voltage detection method of embodiment 1.

As described above, even with the connection cable including the control circuit of this embodiment, the signal equivalent to the same DC signal output can be input to the reception device regardless of whether the transmission device is AC signal output or DC signal output, as in embodiment 1. Therefore, there is an effect that it is not necessary to prepare multiple cables or relay devices.

Embodiment 3

Figure 6:
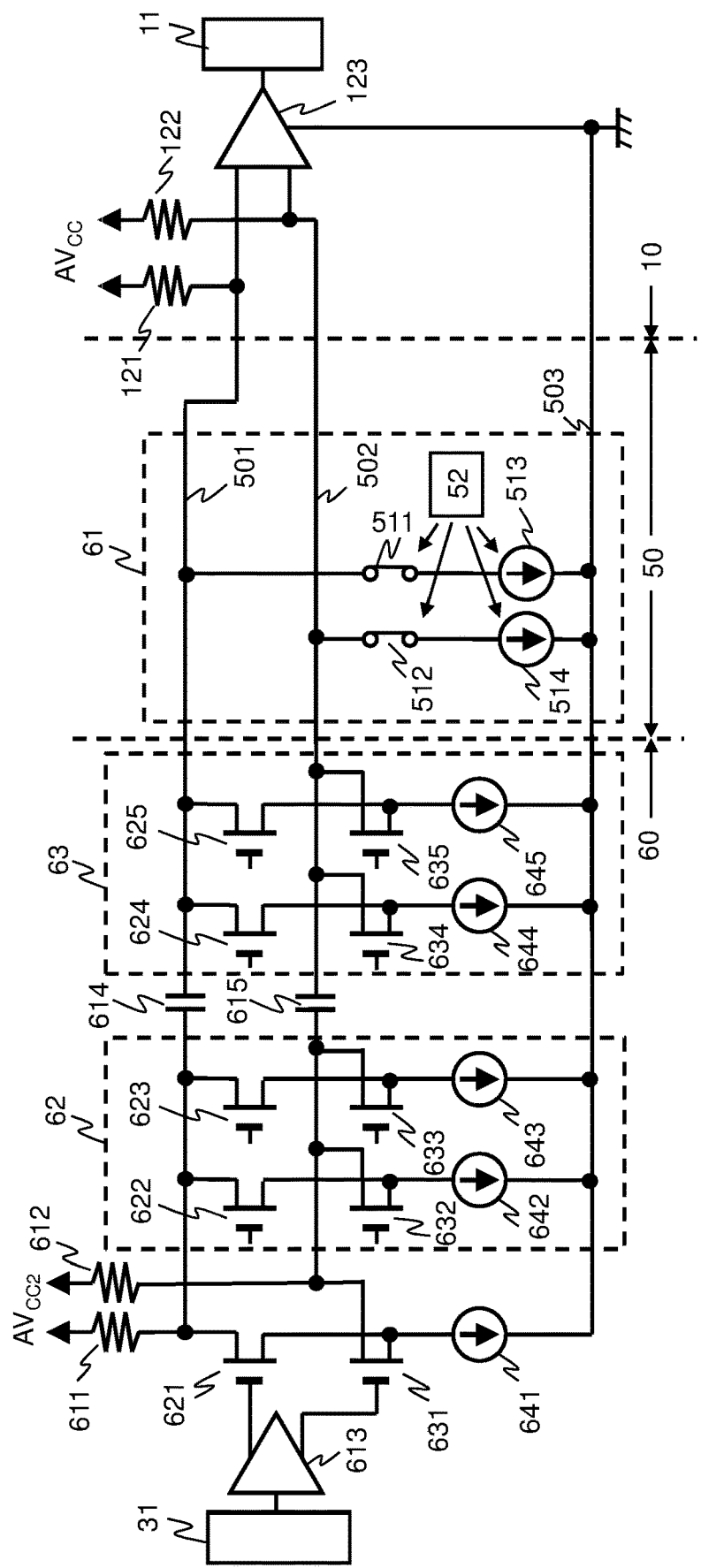
FIG. 6 is a diagram illustrating a configuration of transmission system in Embodiment 3.

FIG. 6 is a diagram illustrating a configuration of transmission system in this embodiment when using the transmission device whose concept is described in Patent Document 2.

In FIG. 6, the transmission device 60 with the AC signal output includes TMDS encoder 31, driver 613, Transistors 621 to 625, 631 to 635, constant current circuits 641-645, terminating resistors 611 and 612, and DC blocking elements 614 and 615 in the configuration. The configuration of the connection cable 50 and the reception device 10 is the same as in embodiment 1, and a detailed description is omitted.

Upon receiving the TMDS encoder output, the driver 613 controls the transistors 621 and 631, and distributes the constant current pulled by the constant current circuit 641 to the terminating resistor 611 and the DC blocking element 614, or the terminating resistor 612 and the DC blocking element 615. Since the DC blocking elements 614 and 615 are connected to the terminating resistors 121 and 122 of the reception device 10, respectively, the + side 501 and the − side 502 of the differential signal line each have two terminating resistors of 50Ω connected in parallel at high frequency. Therefore, in order to obtain a signal output equivalent to that of the transmission device 30, the constant current circuit 641 needs to pull out approximately 20 mA, which is about twice the current of 10 mA specified by TMDS.

Correction circuit 62 and correction circuit 63 are arranged before and after the DC blocking elements 614 and 615. As described in Patent Document 2, the correction circuit 62 suppresses DC level fluctuations of the signal, while the correction circuit 63 operates in a reverse operation of the correction circuit 62 to return the signal waveform to the signal before it was corrected by the correction circuit 62. The reverse operation means that when the correction circuit 62 pulls a predetermined current from the + side signal line, the correction circuit 63 pulls almost the same predetermined current from the − side signal line. Similarly, when the correction circuit 62 pulls a predetermined current from the − side signal line, the correction circuit 63 pulls approximately the same predetermined current from the + side signal line.

In FIG. 6, an example of the realization of correction circuits 62 and 63 is shown. 2 mA constant current circuits 642 to 645 and transistors 622 to 625, 632 to 635 compensate for DC level fluctuations caused by an imbalance in the numbers of logic 0 and 1 and add a current to the DC blocking element based on the tables shown in FIGS. 7 and 8 for a correction operation for suppressing the DC level fluctuation. FIGS. 7 and 8 show the correction currents for correction circuit 62 and 63, respectively.

The logic ratio, which is the ratio of the numbers of logic 0 and 1, is roughly classified into a period of 6:4, a period of 5:5, and a period of 4:6. The current flowing through the DC blocking element has an amplitude of 10 mA based on the TMDS specification, and in order to correct the unbalance amount, it is calculated as 20%, that is, 2 mA, so the constant current circuits 642 to 645 for correction are Using correction circuit 62 as an example, if the logic ratio is 5:5, no correction is required, and if the logic ratio is 6:4, 2 mA is subtracted (i.e., an extra 2 mA is pulled out to the GND line) and adjust DC level. For a logic ratio of 4:6, add 2 mA (i.e., 2 mA is supplied from the power supply AVcc in the transmission device).

Further, the correction circuit 63 is the reverse operation thereof, with a logic ratio of 5:5, no correction is required, and with a logic ratio of 6:4, 2 mA is added (i.e., 2 mA is supplied from the power supply AVcc in the transmission device). If the logic ratio is 4:6, subtract 2 mA (i.e., an extra 2 mA is pulled out to the GND line) to adjust the DC level.

Note that it would be better if the correction current could be set to 0±2 mA, but since the circuit configuration becomes difficult, FIGS. 7 and 8 show an example in which the correction current having a logic ratio of 5:5 is set to 2 mA and set to 2 mA±2 mA. In addition, although the drivers of the transistors 622 to 625 and 632 to 635 and their control signals are not shown, the period information of each logic ratio is obtained from the TMDS encoder 31, and the switch operation is performed by the same driver as the driver 613.

Further, although the correction circuits 62 and 63 use two constant current circuits and four transistors, respectively, they may be halved. For example, in the correction circuit 62, a resistor of about 50 to 330Ω is inserted between the transistor 622 and the DC blocking element 614 and between the transistor 632 and the DC blocking element 615, and the constant current circuit 642 is set to pull out about 4 mA. If the transistors 622 and 632 are turned on simultaneously, the current can be distributed almost evenly by 2 mA with the inserted resistance of about 50 to 330Ω. In this way, 2 mA±2 mA may be realized. Similarly, the correction circuit 63 may also halve the number of constant current circuits and transistors.

In the correction operation after the DC blocking elements 614 and 615, when the period of logic ratio 6:4 and 4:6 are not the same length, a difference occurs in the correction current applied to the + side 501 and the − side 502 of the differential signal line, and DC potential difference occurs between the + side and the − side of the differential signal line, and the reliability of the differential signal transmission may be impaired. As a countermeasure, a control circuit 52 that suppresses the DC potential difference is shown in FIG. 9.

Figure 9:
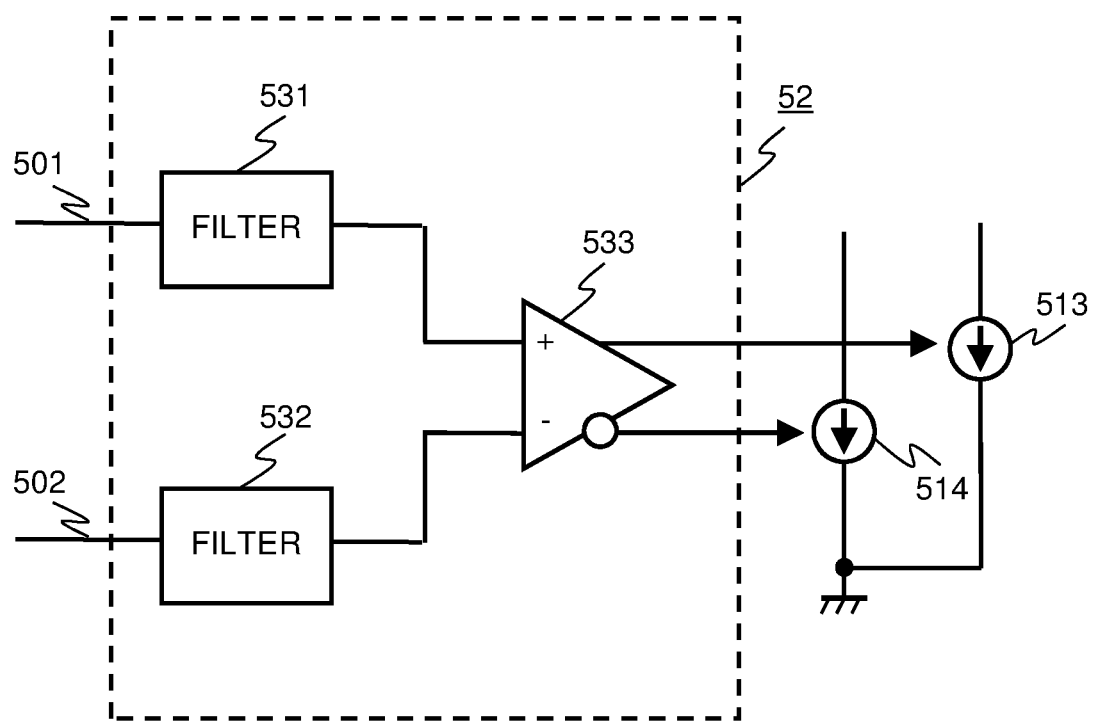
FIG. 9 is a diagram illustrating a configuration of a control circuit in a connection cable in Embodiment 3.

In FIG. 9, the potentials of the + side 501 and the − side 502 of the differential signal line are time-averaged by the filters 531 and 532, respectively, and the respective DC levels are extracted, and the differential amplifier 533 controls the constant current amount of the constant current circuits 513 and 514 so that the difference in DC level is small. That is, the time-averaged value of the differential voltage between the + side 501 and the − side 502 of the differential signal line is detected and the + side current control element (constant current circuit 513) and −side current control element (constant current circuit 514) are controlled, and reducing the time-averaged value of the differential voltage, and the operation is performed so that the time-averaged voltages on the + side and the − side are approximately equal. In other words, at the time of AC signal output, the amount of current extraction is adjusted so that the time-averaged value of the differential voltage of the differential signal line becomes small, that is, the DC levels on the + side and the − side of the differential signal line are almost the same.

In the configuration shown in FIG. 6, since the constant current circuits 644 and 645 pull out a total of 4 mA, the total current value of the constant current circuits 513 and 514 may be controlled to be 10 mA−4 mA=6 mA. Whether or not the transmission device 60 has already pulled 4 mA can be determined by detecting the pulled amount using the return current detection circuit described in FIG. 5, and the total current value of constant current circuits 513 and 514 can be set.

Although constant current circuits 513 and 514 are described separately in FIG. 9, a current circuit for pulling out the total current of them is prepared, and feedback control may be performed as an operation of distributing the pulled out current to the + side 501 and the − side 502 of the differential signal line under the control of the differential amplifier 533. Further, since this operation is unnecessary for the transmission device 30 with DC signal output, as described in the embodiment 1 and 2, the switches 511 and 512 may be opened (OFF) when the transmission device with DC signal output is detected.

As described above, according to this embodiment, since a signal having a small DC level difference between the differential signal lines can be provided to the reception device, highly reliable video transmission can be realized.

Embodiment 4

In the third embodiment, the correction circuit for suppressing the DC potential difference between the + side 501 and the − side 502 of the differential signal line is provided in the connection cable 50, but by providing it in the transmission device, although it is an AC signal output type, it is possible to obtain a signal equivalent to a DC signal output type. This configuration is described in this embodiment.

Figure 10:
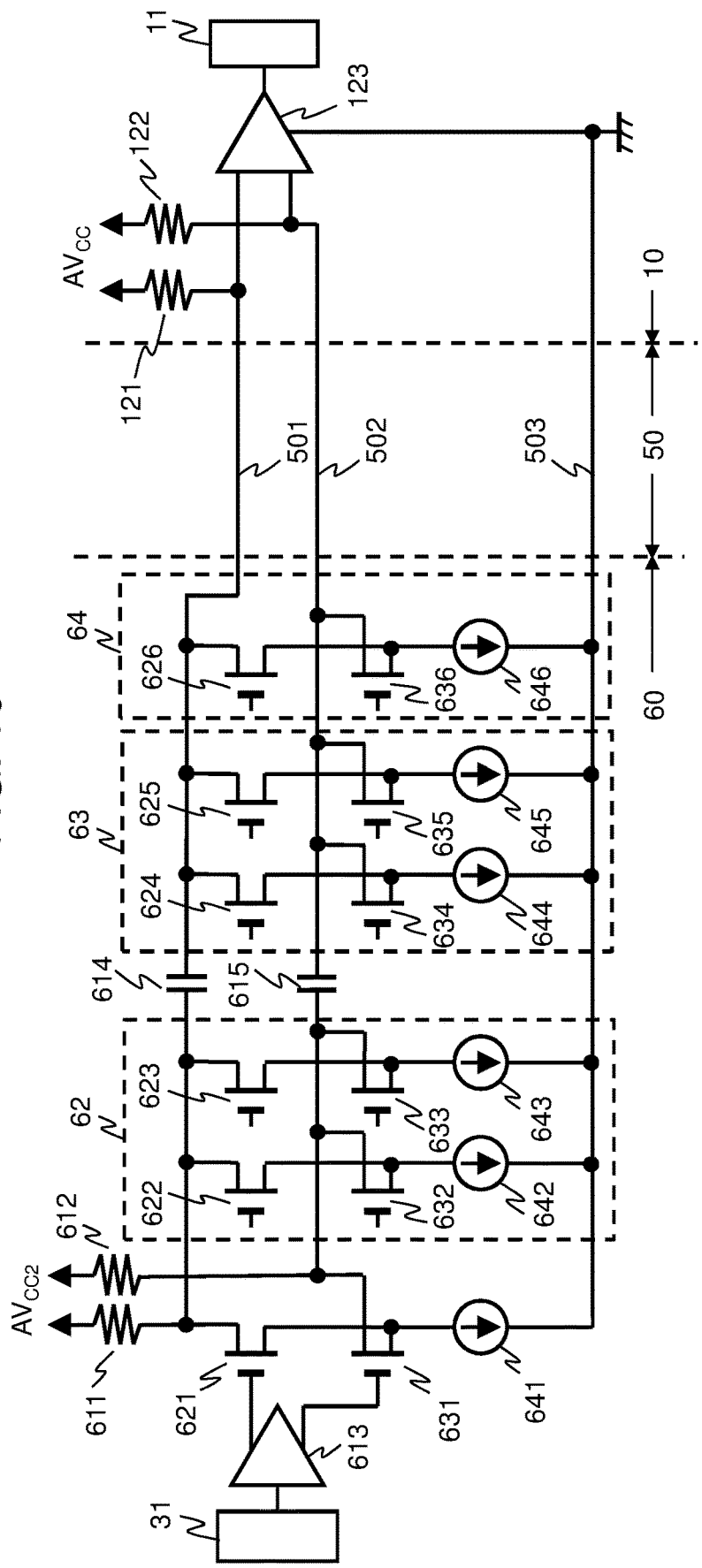
FIG. 10 is a diagram illustrating a configuration of a transmission system in Embodiment 4.

FIG. 10 is a diagram illustrating a configuration of a transmission system in this embodiment. In FIG. 10, the same functions as in FIG. 6 are marked with the same symbols and their descriptions are omitted. In FIG. 6, the DC potential difference between the + side and the − side of the differential signal lines was suppressed in the connection cable 50, but in FIG. 10, a correction circuit 64 including a constant current circuit 646 and transistors 626 and 636 is provided in the transmission device 60 to realize the same operation.

In FIG. 10, the constant current circuit 646 pulls the same constant current as the total value of the constant current circuits 513 and 514 in FIG. 6, and the transistors 626 and 636 determine the current distribution on the + side 501 and the − side 502 of the differential signal line. As described in the third embodiment, it is preferable to feed back the DC potential difference with a filter and a differential amplifier (not shown in FIG. 10) for suppression control.

On the other hand, once the video output format is determined, the time ratio of the logic ratio 6:4 and 4:6 can be calculated, and the current of the constant current circuit 646 may be distributed based on the calculated value. Further, a dedicated constant current circuit for the + side and constant current circuit for the − side of the differential signal line may be provided and the constant current values may be set for each. In addition, the control method of allocating the correction current according to the time of the logic ratio 6:4 and 4:6 can be applied not only to the correction circuit 64 but also to the correction circuits 62 and 63.

As described above, by using correction circuits 62, 63 and 64 for adding and subtracting these currents, the AC signal output can be corrected to equivalent signal to the DC signal output, so that the consistency with existing cables and the reception device is achieved, and it is possible to realize a transmission device capable of outputting a high and reliable video signal.

In the above embodiments, we have described an embodiment of time averaging processing for DC level and return current detection, etc. Here, since the TMDS signal via the DC blocking element is observed prominently in the horizontal and vertical scanning cycles, time averaging may be performed at least several a plurality of times the horizontal scanning cycle, and preferably the vertical scanning cycle or longer. Further, the time averaging process may be configured by a low frequency filter having a time constant of a plurality of times or more of the horizontal scanning cycle, preferably or more of the vertical scanning cycle, or may be digitally calculated averaging.

Although the above embodiments have been described, the invention is not limited to the above embodiments but includes various variations. For example, the above embodiments are described in detail for the purpose of explaining the invention in an easy-to-understand manner and are not necessarily limited to those having all the described configurations. It is also possible to replace a part of the configuration of one embodiment with the configuration of another embodiment, and it is also possible to add the configuration of another embodiment to the configuration of one embodiment. It is also possible to add, delete, or replace some of the configurations of each embodiment with other configurations.

REFERENCE SIGNS LIST

10: Reception device, 11: TMDS decoder, 30, 40, 60, 70: Transmission device, 31: TMDS encoder, 50: Connection cable, 52: Control circuit, 61, 62, 63, 64: Correction circuit, 121, 122, 611, 612: Termination resistor, 123: Receiver, 321, 431, 613: Driver, 322, 323, 621-626, 631-636: Transistor, 501: + side of the differential signal line, 502: − side of the differential signal line, 503: GND line, 324, 513, 514, 641-646: Constant current circuit, 432, 433: Resistor, 434, 435, 614, 615: DC blocking element, 511, 512: Switch, 521, 531, 532: Filter, 522: Voltage detector, 523: Current detector, 525: Current judge, 533: Differential amplifier.

The invention claimed is:

1. A relay device for relaying a video signal from a transmission device to a reception device, comprising:
a differential signal lines including a + signal line and a − signal line that transmits digital differential signal supplied as a video signal from the transmission device,
a GND line,
a control circuit detects whether the transmission device is an AC type transmission device that outputs DC blocked digital differential signals for each of the + signal and the − signal or a DC type transmission device outputs the digital differential signal that is not DC blocked, and
a current pulling circuit pulls a predetermined current from the + signal line and the − signal line to the GND line,
wherein each of the + signal line and the − signal line connects terminating voltage based on the GND line, via terminating resistor on the reception device,
potential difference of the + signal line and the − signal line is outputted to the reception device as the video signal,
the control circuit performs control that the current pulling circuit pulls a predetermined current respective from the + signal line and the − signal line, in case of detecting the transmission device is the AC type transmission device, performs control that the current pulling circuit so as not to pull the current in case of detecting the transmission device is the DC type transmission device.

2. The relay device according to claim 1 is a connection cable that connects the transmission device and the reception device each other.

3. The relay device according to claim 1, wherein
the control circuit preforms time averaging processing on a voltage of the + signal line or the − signal line with a filter, and when the processing result is equal to or higher than a predetermined voltage value, detects that the transmission device is the AC type transmission device.

4. The relay device according to claim 1, wherein
the control circuit detects a current flowing through the GND line connected to the transmission device and performs time averaging processing with a filter, and when the processing result is equal to or higher than a predetermined current value, detects that the transmission device is the DC type transmission device.

5. A reception device for receiving a video signal from a transmission device, comprising:
a differential signal lines including a + signal line and a − signal line that transmits digital differential signal supplied as a video signal from the transmission device,
a GND line,
a control circuit detects whether the transmission device is an AC type transmission device that outputs DC blocked digital differential signals for each of the + signal and − signal or a DC type transmission device outputs the digital differential signal that is not DC blocked,
a current pulling circuit pulls a predetermined current respectively from the + signal line and the − signal line to the GND line,
a terminating resistor is each connected between each of the + signal line and the − signal line and a terminating voltage based on the GND line,
wherein the control circuit performs control that the current pulling circuit pulls the predetermined current respective from the + signal line and the − signal line, in case of detecting the transmission device is the AC type transmission device, performs control that the current pulling circuit so as not to pull the current and transmits video signal from the transmission device to the reception device, in case of detecting the transmission device is the DC type transmission device.

6. The reception device according to claim 5, wherein
the control circuit performs time averaging processing on voltage of the + signal line or the − signal line with a filter, and when the processing result is almost the same as the terminating voltage supplied by the reception device, detects that the transmission device is AC type transmission device.

7. The reception device according to claim 5, wherein
the control circuit detects a current flowing through the GND line connected between the transmission device and performs time averaging processing with a filter, and when the processing result is equal to or higher than a predetermined current value, detects that the transmission device is the DC type transmission device.

8. The relay device according to claim 1, comprising:
the control unit detects a time average value of a differential voltage between the + signal line and the − signal line and controls the current pulling circuit of the + signal line and current pulling circuit of the − signal line, and reduces the time average value of the differential voltage.

9. A transmission device for outputting a digital differential video signal, comprising:
an encoder generates the digital differential video signal by encoding a video signal,
an output terminal for outputting the digital differential signal to a reception device via a + signal line, a − signal line, and a GND line,
a DC blocking element that is placed each of the + signal line and the − signal line between the encoder and the output terminal, to block a DC component of the signal;
a first correction circuit that adds or subtracts a predetermined current respectively from the + signal line and the − signal line on side the encoder,
a second correction circuit and a third correction circuit that add or subtract a predetermined current from the + signal line and the − signal line on the output terminal side, respectively, wherein the first correction circuit reduces the DC component by adding or subtracting a predetermined current according to the ratio of the number of encoded logic 1 and logic 0, the second correction circuit substantially reverse-corrects the current added or subtracted by the first correction circuit, and the third correction circuit adds or subtracts a current corresponding to the difference between a predetermined DC current, which is a connection requirement with the reception device, and an addition/subtraction current by the second correction circuit.

10. The transmission device according to claim 9, wherein the connection requirement with the reception device is a TMDS signal that alternately pulls out approximately 10 mA from the + signal line and the − signal line through the output terminal based on an encoding logic, the first correction circuit pulls out approximately 0 mA, approximately 2 mA, and approximately 4 mA for each period in which the distribution ratio of the encoded logic 1 and logic 0 is approximately 4:6, 5:5, and 6:4, the second correction circuit pulls out approximately 4 mA, approximately 2 mA, and approximately 0 mA for each of the periods, and the third correction circuit distributes and controls approximately 6 mA to the + side and the − side so that an average value of equal to or longer than a vertical scanning cycle of the difference potential value respectively of the + signal line and the − signal line of the output terminal approaches 0.

11. The relay device according to claim 9 is connection cable that connects the transmission device and the reception device each other.

* * * * *